(No Model.)

H. G. MORRIS & P. G. SALOM.
METHOD OF FILLING SECONDARY BATTERY PLATES.

No. 383,757. Patented May 29, 1888.

Witnesses:
Jno. E. Parker.
William D. Conner.

Inventors:
Henry G. Morris &
Pedro G. Salom.
by their Attorneys.
Howson & Howson

United States Patent Office.

HENRY G. MORRIS AND PEDRO G. SALOM, OF PHILADELPHIA, PENNSYLVANIA.

METHOD OF FILLING SECONDARY-BATTERY PLATES.

SPECIFICATION forming part of Letters Patent No. 383,757, dated May 29, 1888.

Application filed January 13, 1888. Serial No. 260,587. (No model.)

*To all whom it may concern:*

Be it known that we, HENRY G. MORRIS and PEDRO G. SALOM, both citizens of the United States, and residents of Philadelphia, Pennsylvania, have invented certain Improvements in the Mode of Filling Secondary-Battery Plates, of which the following is a specification.

The object of our invention is to evenly distribute the active material of a secondary-battery plate upon the supporting-plate, and to firmly and uniformly pack said material in the interstices or cells of the plate. This object we attain as fully described hereinafter, reference being had to the accompanying drawings, in which—

Figure 6:
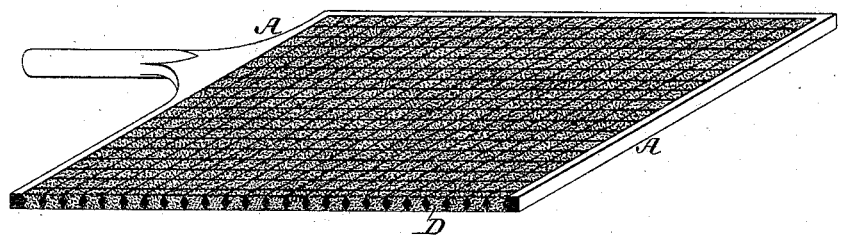

Figures 1, 2, 3, 4, and 5 are sectional perspective views illustrating the different steps of the process, and Fig. 6 is a sectional perspective view of a finished plate.

It is well understood that a secondary-battery plate should have the active material uniformly distributed and of uniform density throughout. Otherwise the chemical action at certain parts of the plate being greater than at others, owing to the currents of electricity taking the line of least resistance, will cause the plate to buckle or warp and the active matter to fall out.

Figure 1:
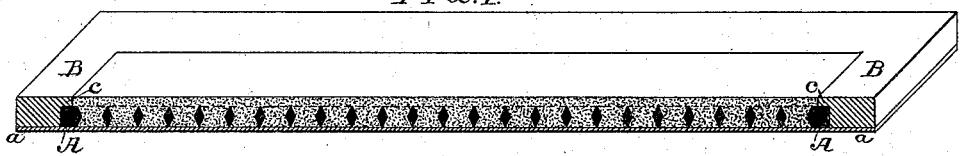
Figure 2:
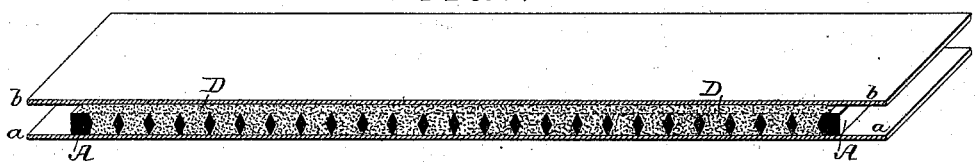
Figure 3:
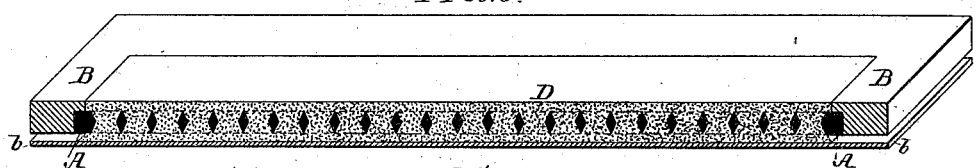
Figure 4:
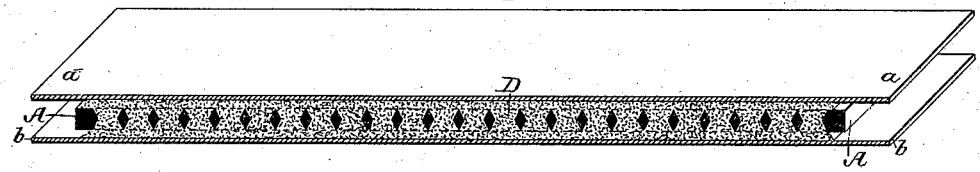
Figure 5:
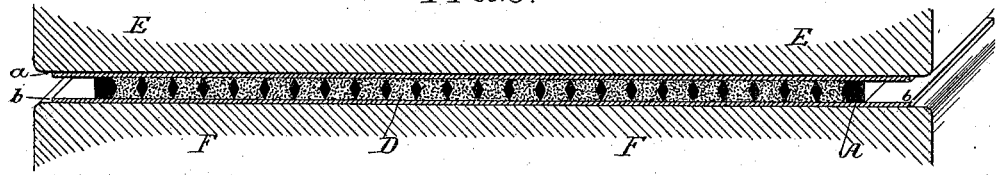

In the present method of applying paste to the grid or supporting-frame it is customary to first put a quantity of the paste in the middle of the supporting-frame and then work it out to the edges; but in almost every instance the packing at the center of the plate is of greater density than at the periphery. To overcome this objection and form a perfectly-uniform plate, we proceed as follows:

Referring to Fig. 1 of the drawings, A represents the supporting-frame or grid, which is placed upon a sheet, *a*, of metal or other suitable material, a frame, B, being then placed over the grid and adapted to fit snugly around the periphery of the same, said frame being somewhat higher than the grid, and, by preference, provided with a lip, *c*, extending over the edge of said grid to a point adjacent to the first row of openings therein. The active material D, preferably in a powdered form, is then dusted over the grid, filling the cells or interstices of the same, as shown in Fig. 1, after which a scraper is passed over the frame B, so as to remove all the superfluous material, leaving a smooth and even surface level with the top of the frame. The frame is then removed, and a thin metal sheet, *b*, similar to the sheet *a*, is placed upon the powdered material, as shown in Fig. 2, after which the grid is turned over, so that the plate *b* is underneath and the plate *a* on top. The latter plate is then removed, the frame B again placed upon the grid and the powdered active material dusted over the upper side of the latter, after which the scraper is passed over the frame B to remove the surplus material, as shown in Fig. 3, the frame B being then removed and the plate *a* replaced, as shown in Fig. 4, the active material being now uniformly distributed to a certain depth above and below the grid and in the cells of the same. The next step in the operation is to insert the grid A and plates *a* and *b*, with the interposed active material, between the upper and lower dies, F F, of a suitable press, by which the active material is compressed into the cells of the grid, the quantity of material previously applied having been properly gaged with reference to such compression. By this means the active material is uniformly distributed throughout the cells of the grid and densely and uniformly packed therein.

In some instances the active material may be placed upon one side only of the grid prior to compression; but we prefer the above-described method, as by it we obtain a perfect plate.

We claim as our invention—

1. The mode herein described of forming secondary-battery plates, said mode consisting in filling the cells or interstices of the grid with powdered active material, placing a uniform layer of said active material on one or both sides of the grid, and then compressing the surplus material into the cells of the grid, all substantially as specified.

2. The mode described of filling a secondary-battery plate, said mode consisting in mounting the grid on a supporting-plate, applying a retaining-frame to the top of the grid, placing the active material in the cells of the grid and piling it above the same, removing the surplus material until it is level with the top of the retaining-frame, and then removing the latter and compressing the surplus material into the cells of the grid, all substantially as specified.

3. The mode described of filling a secondary-battery plate, said mode consisting in mounting the grid on a supporting-plate, applying a retaining-frame to the top of the grid, filling the cells of the latter with the active material and piling the latter above the same, removing the surplus material until it is level with the top of the retaining-frame, then reversing the grid and repeating the operation on the other side of the same, and finally compressing the two layers of surplus material into the cells of the grid, all substantially as specified.

In testimony whereof we have signed our names to this specification in the presence of two subscribing witnesses.

HENRY G. MORRIS.
PEDRO G. SALOM.

Witnesses:
HARRY SMITH,
HENRY HOWSON.